United States Patent

Thackeray et al.

[11] Patent Number: 5,316,877
[45] Date of Patent: May 31, 1994

[54] ELECTROCHEMICAL CELL

[75] Inventors: Michael M. Thackeray; Rosalind J. Gummow, both of Pretoria, South Africa

[73] Assignee: Technology Finance Corporation (Proprietary) Limited, Transvaal Province, South Africa

[21] Appl. No.: 112,886

[22] Filed: Aug. 27, 1993

[30] Foreign Application Priority Data

Aug. 28, 1992 [ZA] South Africa ............... 92/6544

[51] Int. Cl.$^5$ ................................. H01M 10/40
[52] U.S. Cl. ........................ 429/197; 429/218; 429/224
[58] Field of Search ........... 429/218, 194, 197, 224; 423/599, 635, 594, 605; 29/623.1

[56] References Cited

U.S. PATENT DOCUMENTS

| | | | |
|---|---|---|---|
| 5,084,366 | 1/1992 | Toyoguchi | 429/224 |
| 5,135,732 | 8/1992 | Barboux et al. | 429/224 X |
| 5,169,736 | 12/1992 | Bittihn et al. | 429/223 X |
| 5,240,794 | 8/1993 | Thackeray et al. | 429/224 |

Primary Examiner—Anthony Skapars
Attorney, Agent, or Firm—Arnold, White & Durkee

[57] ABSTRACT

An electrochemical cell comprises a cell housing, and a cathode located in the cell housing. The cathode comprises at least one electrochemically active compound of lithium, manganese and oxygen. The compound has a spinel-type structure and has the general formula $$Li_1D_{x/b}Mn_{2-x}O_{4+\delta}$$

where
(i) x is a number such that $0 \leq x < 0,33$;
(ii) $\delta$ is a number such that $0 \leq \delta < 0,5$, with the values of x and $\delta$ being such that the oxidation state N of the manganese cation is $3,5 < N < 4,0$;
(iii) D is a mono- or multi-valent metal cation; and
(iv) b is the oxidation state of D.

An electrolyte is also located in the cell housing. The cell housing, electrolyte and cathode are arranged to permit a charging potential to be applied to the cell to cause lithium from the cathode to form, in the cell housing, at least part of the anode, while the electrolyte couples the cathode electrochemically to the anode, and insulates it electronically therefrom.

14 Claims, 9 Drawing Sheets

ELECTROCHEMICAL CELL

The present invention claims priority from South African Provisional Patent Application No. 92/6544, filed Aug. 28, 1992.

THIS INVENTION relates to an electrochemical cell. It relates also to a method of making an electrochemical cell.

According to a first aspect of the invention, there is provided an electrochemical cell, which comprises:

a cell housing;

a cathode located in the cell housing, the cathode comprising at least one electrochemically active compound of lithium, manganese and oxygen, having a spinel-type structure and having the general formula $$Li_1D_{x/b}Mn_{2-x}O_{4+\delta}$$

where
(i) x is a number such that $0 \leq x < 0,33$;
(ii) $\delta$ is a number such that $0 \leq \delta < 0,5$, with the values of x and $\delta$ being such that the oxidation state N of the manganese cation is $3,5 < N < 4,0$;
(iii) D is a mono- or multi-valent metal cation; and
(iv) b is the oxidation state of D; and
an electrolyte located in the cell housing,
with the cell housing, electrolyte and cathode arranged to permit a charging potential to be applied to the cell to cause lithium from the cathode to form, in the cell housing, at least part of the anode, while the electrolyte couples the cathode electrochemically to the anode, and insulates it electronically therefrom.

In respect of the compound, in one embodiment of the invention, D may be Li so that b is 1, with formula (1) then being $Li_{1+x}Mn_{2-x}O_{4+\delta}$. However, in other embodiments of the invention, D may be a metal cation other than Li. It may then be a divalent metal cation such as Mg so that b is 2. When D is Mg, formula (1) becomes $Li_1Mg_{x/2}{}^{2+}Mn_{2-x}O_{4+\delta}$. In a further embodiment of the invention, D can be a monovalent metal cation other than Li, such as Ag, with formula (1) then becoming $Li_1Ag_xMn_{2-x}O_{4+\delta}$. In still a further embodiment of the invention, D can instead be a trivalent metal cation such as $Co^{3+}$ so that formula (1) then becomes $Li_1Co_{x/3}{}^{3+}Mn_{2-x}O_{4+\delta}$.

The principles of the invention will hereinafter be demonstrated with particular reference to the case where D is Li, i.e. when formula (1) is $Li_{1+x}Mn_{2-x}O_{4+\delta}$. The oxidation state, N, of the manganese cations in the compound thus ranges between 3,5 and 4,0 but excludes 3,5 and 4,0. The compound of the cathode is thus found in the Li-Mn-O phase diagram and, with reference to an isothermal slice of the Li-Mn-O phase diagram at 20° C., lies in the tie triangle having at its apices, $LiMn_2O_4$, $Li_4Mn_5O_{12}$ and $Li_2Mn_4O_9$, i.e. falls within the area of the triangle whose boundary is defined by the $LiMn_2O_4$-$Li_2Mn_4O_9$ tie line, the $Li_2Mn_4O_9$-$Li_4Mn_5O_{12}$ tie line, and the $Li_4Mn_5O_{12}$-$LiMn_2O_4$ tie line. Therefore, in accordance with the invention, compounds excluded from the tie triangle are $LiMn_2O_4$ and all compounds lying on the tie line between $Li_4Mn_5O_{12}$ and $Li_2Mn_4O_9$, such compounds being represented by $Li_2O \cdot yMnO_2$ with $2,5 \leq y \leq 4,0$.

Preferably, in respect of the compound, $0 \leq x < 0,2$ and $0 \leq \delta < 0,2$ so that N ranges between 3,5 and 3,78. The compound then lies, with reference to said Li-Mn-O phase diagram isothermal slice, in the tie triangle having at its apices $LiMn_2O_4$, $Li_{1,2}Mn_{1,8}O_4$ and $LiMn_2O_{4,2}$, i.e. falls within the area of the triangle whose boundary is defined by the $LiMn_2O_4$-$LiMn_2O_{4,2}$ tie line, the $LiMn_2O_{4,2}$-$Li_{1,2}Mn_{1,8}O_4$ tie line, and the $Li_{1,2}Mn_{1,8}O_4$-$LiMn_2O_4$ tie line, but excluding, as hereinbefore described, $LiMn_2O_4$.

More preferably, $0 \leq x \leq 0,1$ and $0 \leq \delta \leq 0,1$ so that $3,5 < N \leq 3,74$. More particularly, $\delta$ may be 0 and $0 < x \leq 0,1$ so that $3,5 < N \leq 3,63$. For example, $\delta$ may be 0 and $0 < x \leq 0,05$ so that $3,5 < N \leq 3,56$. The lower limit of N may be 3,51, more preferably 3,505.

The compound of the cathode may be prepared chemically by reacting a lithium containing component selected from lithium salts, lithium oxides, lithium hydroxides and mixtures thereof, and that decomposes when heated in air, with a manganese containing component selected from manganese salts, manganese oxides, manganese hydroxides, lithium manganese oxides and mixtures thereof, and that also decomposes when heated in air, with the proportion of the lithium component to the manganese component being selected to satisfy the stated composition of the compound i.e. $Li_{1+x}Mn_{2-x}O_{4+\delta}$ and with the reaction temperature and reaction time being controlled to provide the correct manganese oxidation state in the compound and to prevent decomposition or disproportion of the reaction product or compound into undesired products.

For example, the lithium component may be lithium hydroxide (LiOH), lithium nitrate ($LiNO_3$) or lithium carbonate ($Li_2CO_3$), while the manganese component may be manganese carbonate ($MnCO_3$).

Typically, when a lithium salt is used and x in $Li_{1+x}Mn_{2-x}O_{4+\delta}$ is $>0$, the reaction temperature will be maintained at 300°–750° C., with temperatures above this resulting in decomposition of the compound into stable stoichiometric spinel and rock salt phases.

Thus, for example, the compound can be formed by heating $MnCO_3$ and $Li_2CO_3$ in air at 300° C. to 750° C. for a period of 2 to 96 hours, according to the reaction:

$$1,95MnCO_3 + 0,525Li_2CO_3 + 0,7625O_2 \rightarrow Li_{1,05}Mn_{1,95}O_4 + 2,475CO_2$$

At higher temperatures the resultant product will decompose according to the following reaction to generate stable stoichiometric spinel and rock salt phases:

$$Li_{1,05}Mn_{1,95}O_4 \rightarrow 0,95LiMn_2O_4 + 0,05Li_2MnO_3$$

However, instead of $MnCO_3$, a manganese dioxide such as $\gamma$-$MnO_2$, which can be either electrolytically or chemically prepared, can be used, with the temperature then being selected such that oxygen is lost during the reaction to give the required stoichiometric compound. Typically the reaction temperature will then be maintained at 300° C. to 750° C.

Thus, the compound can then be formed by heating $\gamma$-$MnO_2$ and LiOH at 300° C. to 750° C. for a period of 2 to 96 hours according to the following reaction:

$$1,05LiOH + 1,95MnO_2 \rightarrow Li_{1,05}Mn_{1,95}O_4 + 0,2125O_2 + 0,525H_2O$$

However, when $x=0$ and $0 \leq \delta \leq 0,2$ in $Li_{1+x}Mn_{2-x}O_{4+\delta}$, lower synthesis temperatures are typically required, for example about 600° C., to obtain a value of $N > 3,5$. Thus, the compound can then be formed by heating $\delta$-$MnO_2$ and LiOH in a 2:1 molar ratio at 300°

C.–600° C. for a period of 2 to 96 hours, according to the reaction:

$$\text{LiOH} + 2\text{MnO}_2 \xrightarrow{0,5O_2} \text{LiMn}_2\text{O}_{4,1}$$

The cell housing may initially contain, as at least part of the anode or negative electrode, electrochemically active lithium, and the anode may be electrochemically connected to an anode terminal. The active lithium may be selected from the group comprising lithium metal, a lithium/aluminium alloy, a lithium/silicon alloy, a lithium/carbon compound and mixtures thereof.

Instead, however, there may initially be no electrochemically active lithium present in the housing and which forms part of the anode.

The electrolyte may be non-aqueous, and comprise a lithium salt, for example, $LiClO_4$, $LiAsF_6$, $LiBF_4$ or mixtures thereof, dissolved in an organic solvent, for example, propylene carbonate, ethylene carbonate, dimethoxy ethane, dimethyl carbonate or mixtures thereof. The anode may be separated from the cathode by a microporous separator of electronically insulating material which is permeable by and impregnated by the electrolyte. Although $LiClO_4$, $LiAsF_6$ and $LiBF_4$ are specifically mentioned above, in principle any suitable salt of lithium dissolved in any suitable organic solvent can be employed for the electrolyte. In such cells the proportions of lithium in the anodes with regard to other constituents of the anodes will typically be what is usually employed in the art.

According to a second aspect of the invention, there is provided a method of making an electrochemical cell, which method comprises loading, into a cell housing, an electrolyte and a cathode comprising at least one electrochemically active compound of lithium, manganese and oxygen, the compound having a spinel-type structure and having the general formula $$Li_1D_{x/b}Mn_{2-x}O_{4+\delta}.$$

where
(i) x is a number such that $0 \leq x < 0,33$;
(ii) $\delta$ is a number such that $0 \leq \delta < 0,5$, with the values of x and $\delta$ being such that the oxidation state N of the manganese cation is $3,5 < N < 4,0$;
(iii) D is a mono- or multi-valent metal cation; and
(iv) b is the oxidation state of D; and arranging the electrolyte and cathode in the housing to permit a charging potential to be applied to the cell to cause lithium from the cathode to form, in the cell housing, at least part of an anode, while the electrolyte couples the cathode electrochemically to the anode, and insulates it electrochemically therefrom.

The method may include the step of producing the cathode by, as hereinbefore described, reacting a lithium containing component selected from lithium salts, lithium oxides, lithium hydroxides and mixtures thereof, and that decomposes when heated in air, with a manganese containing component selected from manganese salts, manganese oxides, manganese hydroxides, lithium manganese oxides and mixtures thereof, and that also decomposes when heated in air, at a reaction temperature of 300°–750° C. for a period of 2–96 hours, to provide the compound of formula (1).

The invention extends also to an electrochemical cell, whenever made by a method as hereinbefore described.

When the electrochemical cell initially has no active lithium anode, it has the advantage that it can be loaded, stored and transported in the absence of any metallic or free lithium. It can thus be transported easily and safely and it can be stored indefinitely, since there is no free lithium present. The cell can, when required for use, simply be commissioned or activated by means of a charging potential, until the cathode is at its fully charged state or between its fully charged or fully discharged states.

Pure lithium electrodes are regarded as unsafe, particularly when used in rechargeable cells, in view of the fire risk if the cells vent during operation. Carbon (graphite) electrodes are used increasingly at the anode of 4 V cells for intercalating the lithium, thereby minimizing the safety risk of rechargeable lithium cells in batteries. In such cells, it is an advantage to use a slightly overdischarged cathode material for supplying the carbon anode with lithium because the carbon anodes do not readily release all of the intercalated lithium back into the system during discharge. There must therefore be a careful balance between the amount of lithium in the cathode or anode for effective cell operation.

Applicant believes that the severity of these problems can at least be reduced by utilizing a lithium manganese oxide compound of formula (1), as electrode material.

The invention will now be described, with reference to the following non-limiting examples, and with reference to the accompanying drawings in which.

Figure 1:
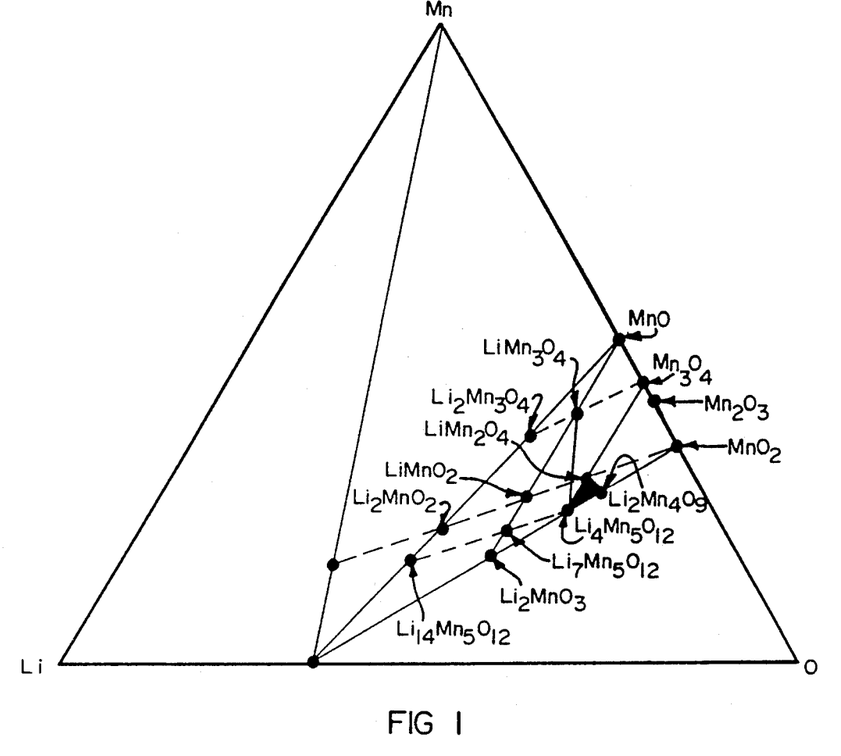
FIG. 1 shows an isothermal slice of the Li-Mn-O phase diagram at 20° C.
Figure 2:
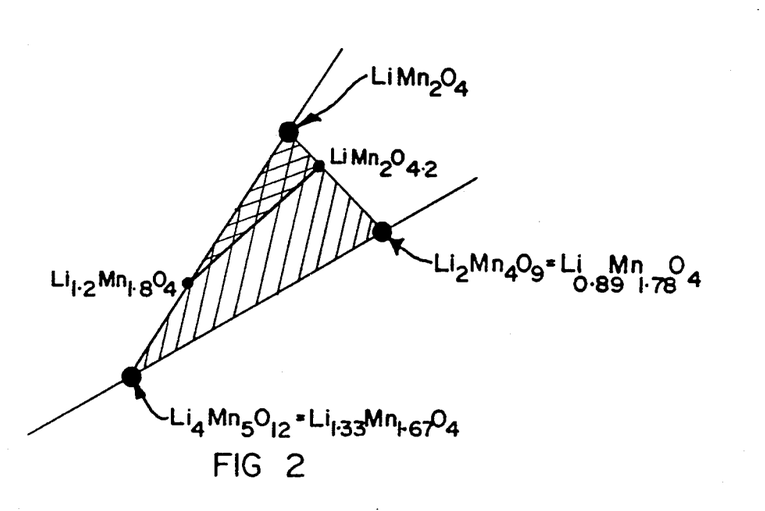
FIG. 2 shows an enlarged view of a portion of the isothermal slice of the Li-Mn-O phase diagram of FIG. 1.

FIGS. 1 and 2 show an isothermal slice at 20° C. of the phase diagram of Li-Mn-O, including a tie triangle having at its apices $LiMn_2O_4$, $Li_4Mn_5O_{12}$ and $Li_2Mn_4O_9$. The electrochemically active lithium, manganese and oxygen based compounds of the cathode of the electrochemical cells of the present invention, and which have a spinel type structure, can be represented by the formula $Li_{1+x}Mn_{2-x}O_{4+\delta}$ where $0 \leq x < 0,33$ and $0 \leq \delta < 0,5$ as hereinbefore described. These compounds are thus defined by said tie triangle, but exclude $LiMn_2O_4$ and compounds on the $Li_4Mn_5O_{12}$ to $Li_2Mn_4O_9$ tie line. More preferred compounds are defined by a tie triangle having at its apices $LiMn_2O_4$, $Li_{1,8}Mn_{1,8}O_4$ and $LiMn_2O_{4,2}$, i.e. where $0 \leq x < 0,2$ and $0 \leq \delta < 0,2$ in the formula $Li_{1+x}Mn_{2-x}O_{4+\delta}$.

In the abovestated formula, when $x=0$ and $\delta=0$ the compound is the spinel $Li(Mn_2)O_4$ and when $x=0,33$ and $\delta=0$, the compound is $Li_{1,33}Mn_{1,67}O_4$ which is also a spinel and can thus be written in spinel notation $Li(Mn_{1,67}Li_{0,33})O_4$ or $Li_4Mn_5O_{12}$. Both these compounds are stoichiometric spinel compounds of general formula $A[B_2]X_4$ in which the X atoms are arranged in a cubic close packed fashion to form a negatively charged anion array comprised of face-sharing and edge-sharing X tetrahedra and octahedra. In the formula $A[B_2]X_4$ the A atoms are tetrahedral site cations, and the B atoms are octahedral site cations, i.e. the A cations and B cations occupy tetrahedral and octahedral sites respectively. In an ideal spinel structure, with the origin of the unit cell at the centre (3 m) the close packed anions are located at 32e positions of the space group Fd3m. Each unit cell contains 64 tetrahedral interstices situated at three crystallographically non-equivalent positions at 8a, 8b and 48f, and 32 octahedral interstices situated at the crystallographically non-equivalent positions 16c and 16d. In an $A[B_2]X_4$ spinel the A cations reside in the 8a tetrahedral interstices and the B cations in the 16d octahedral interstices. There are thus 56 empty tetrahedral and 16 octahedral sites per cubic unit cell.

It is known that spinel lithium manganese oxide compounds can be used in rechargeable lithium cells that operate at approximately 4 V and also at approximately 3 V. Thus, it is known that $LiMn_2O_4$ can be used as an electrode material for 4 v cells when used over the compositional range $Li_{1-y}Mn_2O_4$ where $0 \leq y < 1$, typically in a cell with a configuration:

Li/1M $LiClO_4$ in propylene carbonate/$Li_{1-y}Mn_2O_4$

When y is 0, this 4 V cell is effectively in a discharged state. The cell is charged by removing lithium from the $LiMn_2O_4$ electrode thereby increasing the oxidation state of the cations from 3,5 towards 4,0. During this process the cubic symmetry of the spinel structure is maintained. During charging, lithium is deposited at the anode as hereinbefore described. At y=1, the phase $\lambda$-$MnO_2$ would result at the fully oxidized cathode, but in practice it is extremely difficult to remove electrochemically all the lithium from the spinel structure. The Applicant believes that, at high voltages, some of the $Mn^{3+}$ ions tend to disproportionate according to the reaction:

$$2Mn^{3+} \rightarrow Mn^{4+} + Mn^{2+}$$

and that the $Mn^{2+}$ ions dissolve in the electrolyte and migrate to the lithium anode where they are reduced and passivate the lithium electrode. This is naturally deleterious to the performance of the cell.

The Applicant thus believes that it is possible to reduce the solubility of the spinel electrode by preparing an electrode in which the Mn oxidation state is higher than it is in $LiMn_2O_4$, i.e. by reducing the number of $Mn^{3+}$ ions in the spinel electrode and increasing the concentration of $Mn^{4+}$ ions in the electrode, bearing in mind that in $LiMn_2O_4$ there are an equal number of $Mn^{3+}$ and $Mn^{4+}$ ions in the spinel structure and that the mean oxidation state of Mn therein is thus 3,5.

Thus, the oxidation state of the Mn cations can be increased by replacing manganese by lithium in accordance with the formula $Li_{1+x}Mn_{2-x}O_{4+\delta}$ with $0 < x < 0,33$ and $\delta=0$ or by increasing the concentration of oxygen in the spinel with $x=0$ and $0 < \delta < 0,5$, or by varying both x and $\delta$, in accordance with the invention. Instead, however, the oxidation state of the Mn cations can be increased by doping the lithium manganese oxide with metal cations such as Mg and Co, in accordance with the formulae $Li_1Mg_{x/2}^{2+}Mn_{2-x}O_{4+\delta}$ or $Li_1Co_{x/3}^{3+}Mn_{2-x}O_{4+\delta}$ as hereinbefore described.

However, it is also known that $LiMn_2O_4$ can be used as a nominal 3 V electrode in lithium cells, in which case it acts as a charged cathode. During discharge lithium ions are inserted into $LiMn_2O_4$ spinel cathode until a rock salt $Li_2Mn_2O_4$ stoichiometry is reached. Typically such as cell has a configuration:

Li/1M $LiClO_4$ in propylene carbonate/$Li_{1+x}Mn_2O_4$

This spinel electrode operates as a two phase electrode over the compositional range $Li_{1+z}[Mn_2]O_4$ with $0 \leq z \leq 1$. When lithium is inserted into $LiMn_2O_4$ the cubic symmetry of the spinel structure distorts due to the Jahn-Teller effect, to tetragonal symmetry, i.e. when the Mn oxidation state is approximately 3,5. This distortion process is accompanied by an expansion of the unit cell of approximately 6%. It has been found that $Li_{1+z}Mn_2O_4$ does not operate very effectively as a rechargeable cathode material in nominal 3 V lithium cells operable at about 2,7 V, and the loss of the capacity that has been observed on cycling has been attributed largely to the Jahn-Teller distortion.

Thus, when $LiMn_2O_4$ is used as a cathode in carbon/$LiMn_2O_4$ cells the following disadvantages arise:
- the dissolution of $Mn^{2+}$ ions as described above is brought about by the disproportionation reactions set out above, and
- when loading cells in an overdischarged state the tetragonal phase in the $Li_{1+z}Mn_2O_4$ electrode does not have good cycling properties.

These disadvantages are at least reduced in the electrochemical cell according to the invention, as hereinafter described.

By way of non-limiting example, the use of compounds of formula (1) as hereinbefore described as electrodes in electrochemical cells according to the invention can be demonstrated by adopting the values of $x=0,05$, $x=0,1$ and $x=0,2$ for the formula $Li_{1+x}Mn_{2-x}O_4$ when $\delta=0$ according to the invention or adopting the values of $\delta=0,1$ and $\delta=0,2$ when $x=0$, and comparing these with standard $LiMn_2O_4$ electrodes.

The differences in properties are set out in Table 1.

TABLE 1

| Electrode Starting Composition (Discharged cathode) | Mn Oxidation State of Spinel Electrode | Composition of fully oxidized Spinel Electrode (Mn = 4+) | Theoretical Capacity of fully Oxidized Electrode when dishcarged to stoichiometric spinel composition | Composition of electrode at onset of Jahn-Teller distortion, ie when Mn Ox state = 3,5 |
|---|---|---|---|---|
| $LiMn_2O_4$ | 3,50 | $Mn_2O_4(\lambda\text{-}MnO_2)$ | 154 mAh/g | $LiMn_2O_4$ |
| $Li_{1,05}Mn_{1,95}O_4$ | 3,56 | $Li_{0,2}Mn_{1,95}O_4$ | 132 mAh/g | $Li_{1,175}Mn_{1,95}O_4$ |
| $Li_{1,1}Mn_{1,90}O_4$ | 3,63 | $Li_{0,4}Mn_{1,90}O_4$ | 110 mAh/g | $Li_{1,35}Mn_{1,9}O_4$ |
| $Li_{1,2}Mn_{1,8}O_4$ | 3,78 | $Li_{0,8}Mn_{1,8}O_4$ | 63 mAh/g | $Li_{1,7}Mn_{1,8}O_4$ |
| $LiMn_2O_{4,1}$ | 3,60 | $Li_{0,2}Mn_2O_{4,1}$ | 133 mAh/g | $Li_{1,2}Mn_2O_{4,1}$ |
| $LiMn_2O_{4,2}$ | 3,70 | $Li_{0,4}Mn_2O_{4,2}$ | 101 mAh/g | $Li_{1,4}Mn_2O_{4,2}$ |

Although the theoretical capacities of the fully oxidized electrodes are less than that of $\lambda$-$MnO_2$, it is believed that this disadvantage is countered by the higher average oxidation state of the Mn cations in the starting electrodes as compared to $LiMn_2O_4$ and which suppresses the dissolution of $Mn^{2+}$ cations when lithium is extracted from the electrode. Moreover, these electrodes offer greater stability on cycling compared to $LiMn_2O_4$ since they can form overdischarged cathodes which have cubic not tetragonal symmetry to at least those stoichiometries at which the oxidation state of Mn cations reaches 3,5+, which then triggers the onset of the Jahn-Teller distortion.

Figure 3:
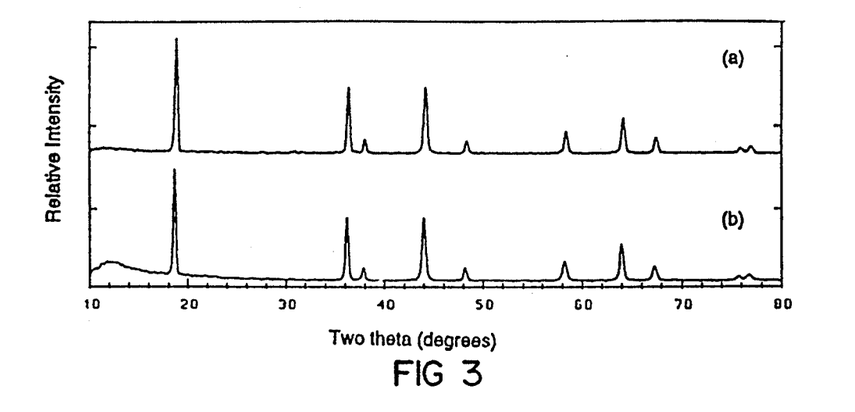
FIG. 3 shows X-ray diffraction patterns of the spinel compounds of Examples 1 and 2.
Figure 4:
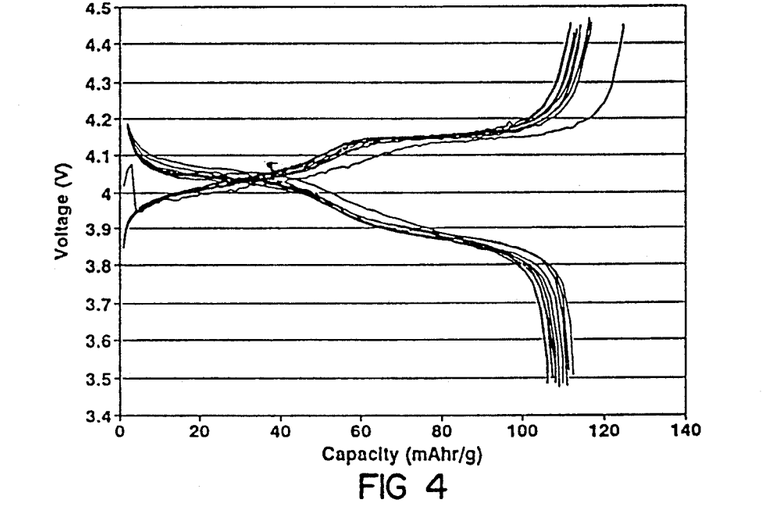
FIG. 4 shows charge and discharge profiles of an electrochemical cell having the compound of Example 1 as an electrode and which cell is not in accordance with the invention.
Figure 12:
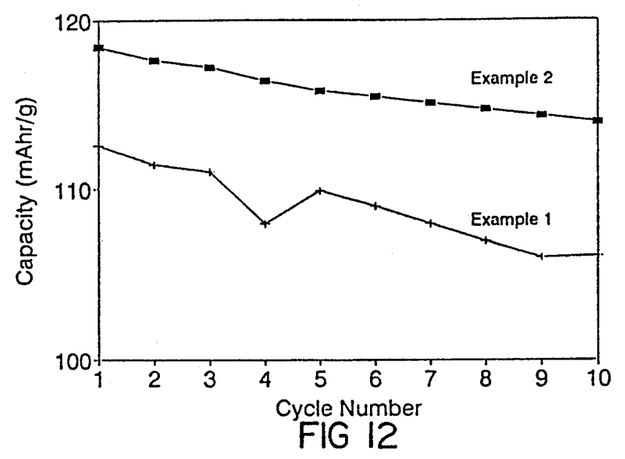
FIG. 12 shows plots of electrode capacity v cycle number for electrochemical cells having the electrodes of Examples 1 and 2.

The compounds of Table 1 can be formed as follows:

EXAMPLE 1 control $LiMn_2O_4$ was synthesized by reacting $LiNO_3.H_2O$ and chemically prepared $\gamma$-$MnO_2$ ('CMD') in a Li:Mn atomic ratio of 1:2. The mixture was ball-milled in hexane, fired in air for 48 hours at 450° C., and thereafter fired for a further 48 hours at 750° C. The X-ray diffraction pattern of the spinel product is shown in FIG. 3 (B), while FIG. 4 shows charge and discharge profiles of an electrochemical cell of the type Li/1M $LiClO_4$ in propylene carbonate/$LiMn_2O_4$ where the $LiMn_2O_4$ was the product of Example 1, for the first 10 cycles. The electrode capacity decreases with cycling as reflected by a plot of the electrode capacity v cycle number given in FIG. 12.

EXAMPLE 2 control

Figure 5:
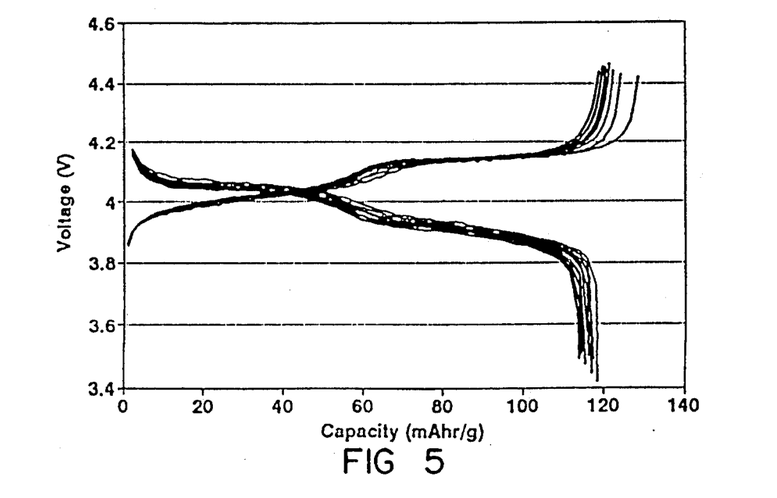
FIG. 5 shows charge and discharge profiles of an electrochemical cell having the compound of Example 2 as an electrode and which cell is not in accordance with the invention.

Example 1 was repeated, save that the $LiNO_3.H_2O$ starting material was replaced by $LiOH.H_2O$. The X-ray diffraction pattern of the spinel product is shown in FIG. 3 (A), while FIG. 5 shows charge and discharge profiles of a cell of the type Li/1M $LiClO_4$ in propylene carbonate/$LiMn_2O_4$ where the $LiMn_2O_4$ was the product of Example 2, for the first 10 cycles. The electrode capacity decreases with cycling as reflected by a plot of the electrode capacity v cycle number given in FIG. 12.

EXAMPLE 3

Figure 6:
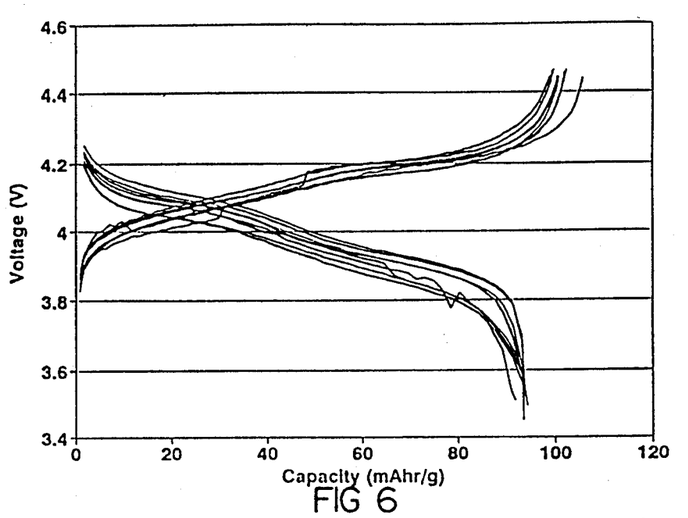
FIGS. 6, 7, 8, 9, 10 and 11 show charge and discharge profiles of electrochemical cells in accordance with the invention, having the compounds of Examples 3, 4, 5, 6, 7 and 8 respectively, as electrodes.
Figure 13:
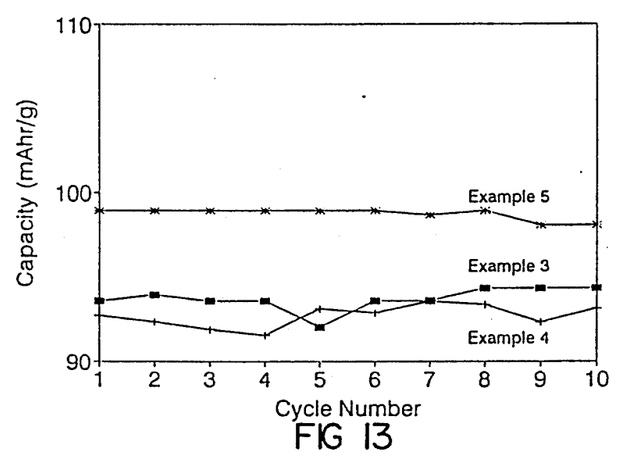
FIG. 13 shows plots of electrode capacity v cycle number for electrochemical cells in accordance with the invention having the electrodes of Examples 3, 4 and 5.
Figure 15:
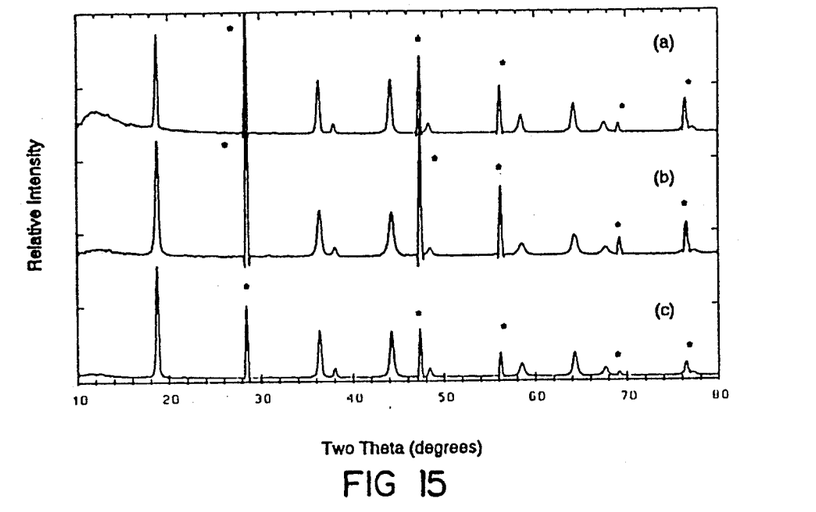
FIG. 15 shows X-ray diffraction patterns of the compounds of Examples 3, 4 and 5, with the asterisks indicating peaks of an internal silicon standard.

$Li_{1,05}Mn_{1,95}O_4$ was prepared by reaction of $LiNO_3.H_2O$ and $\gamma$-$MnO_2$ ('CMD'), with Li:Mn atomic ratio of 1,05:1,95. The mixture was ball-milled in hexane, and fired in air at 450° C. for 48 hours, and then at 750° C. for a further 48 hours. The powder X-ray diffraction pattern of the product is given in FIG. 15(A). FIG. 6 shows charge and discharge profiles of a cell of the type Li/1MLiClO4 in propylene carbonate/$Li_{1,05}Mn_{1,95}O_4$ where the $Li_{1,05}Mn_{1,95}O_4$ was the product of Example 3, for the first 10 cycles, while the improved stability of the electrode as reflected by a plot of the electrode capacity v cycle number given in FIG. 13.

EXAMPLE 4

Figure 7:
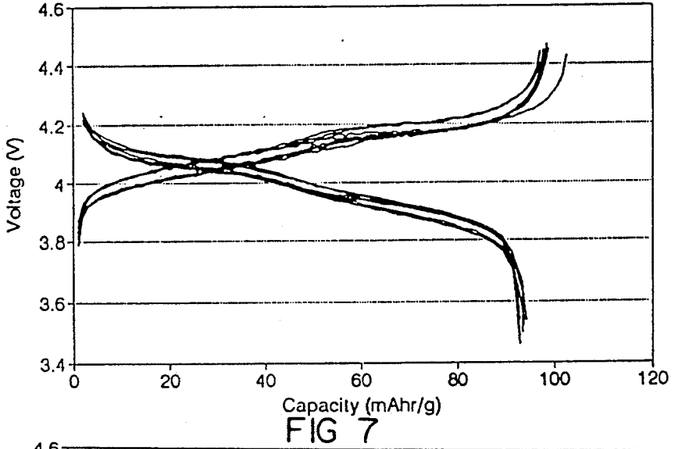

Example 3 was repeated, save that the $LiNO_3.H_2O$ starting material was replaced by $LiOH.H_2O$. The mixture was fired at 450° C. for 48 hours, and then at 570° C. for a further 48 hours. The X-ray diffraction pattern of the product is shown in FIG. 15(B), while FIG. 7 shows charge and discharge profiles of a cell of the type referred to in Example 1 and incorporating the product material of this example as electrode, for the first 10 cycles. The improved stability of the electrode as reflected by a plot of the electrode capacity v cycle number given in FIG. 13.

EXAMPLE 5

Figure 8:
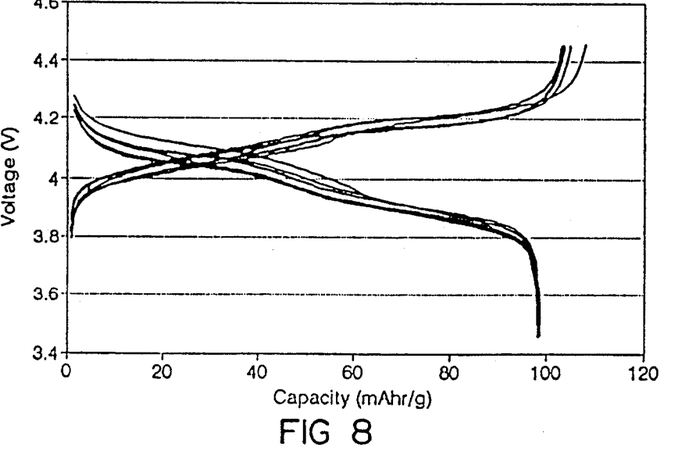

Example 4 was repeated, save that the mixture was fired at 450° C. for 48 hours, and then at 650° C. for a further 48 hours. The X-ray diffraction pattern for the product is shown in FIG. 15(C). FIG. 8 shows charge and discharge profiles for a cell of the type given in Example 1, and incorporating the product material of this example as an electrode, for the first 10 cycles. The improved stability of the electrode as reflected by a plot of the electrode capacity v cycle number given in FIG. 13.

EXAMPLE 6

Figure 9:
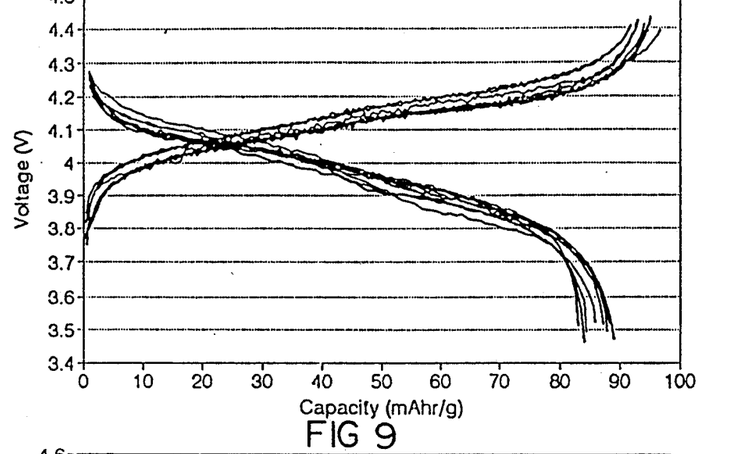
Figure 14:
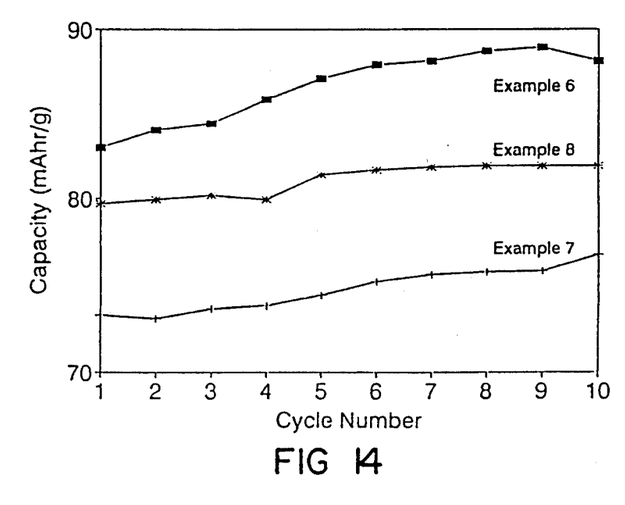
FIG. 14 shows plots of electrode capacity v cycle number for electrochemical cells in accordance with the invention having the electrodes of Examples 6, 7 and 8.
Figure 16:
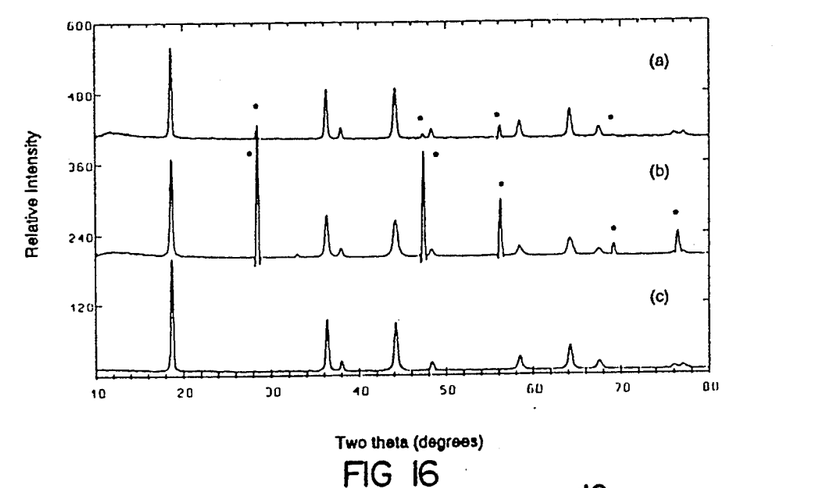
FIG. 16 shows X-ray diffraction patterns of the compounds of Examples 6, 7 and 8, with the asterisks indicating peaks of an internal silicon standard.

$Li_{1,1}Mn_{1,9}O_4$ was prepared by reaction of $LiNO_3 \cdot H_2O$ and $\gamma$-$MnO_2$ ('CMD'), with an Li:Mn atomic ratio of 1,1:1,9. The mixture was ball-milled in hexane, and fired in air at 450° C. for 48 hours. It was then fired for a further 48 hours at 750° C. The powder X-ray diffraction pattern of the product is given in FIG. 16(A). The charge and discharge profiles of a cell of the type given in Example 1 and incorporating the product material of this example as an electrode, for the first 10 cycles, is shown in FIG. 9. The electrode capacity increases slightly with cycling, as reflected by the plot of the electrode capacity v cycle number given in FIG. 14.

EXAMPLE 7

Figure 10:
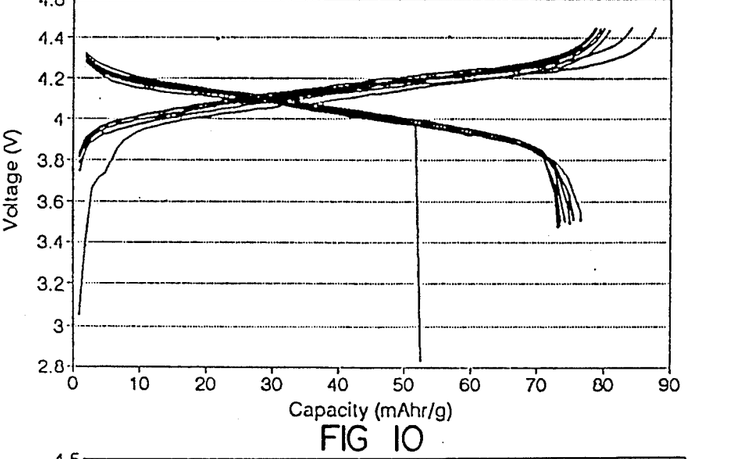

Example 6 was repeated, save that the $LiNO_3 \cdot H_2O$ starting material was replaced by $LiOH \cdot H_2O$. The mixture was fired at 450° C. for 48 hours, and then at 570° C. for a further 48 hours. The powder X-ray diffraction pattern of the product material is given in FIG. 16(B). The charge and discharge profiles of a cell of the type given in Example 1 and incorporating the product material of this example as an electrode, for the first 10 cycles, is shown in FIG. 10. The electrode capacity increases slightly with cycling as reflected by a plot of electrode capacity v cycle number given in FIG. 14.

EXAMPLE 8

Figure 11:
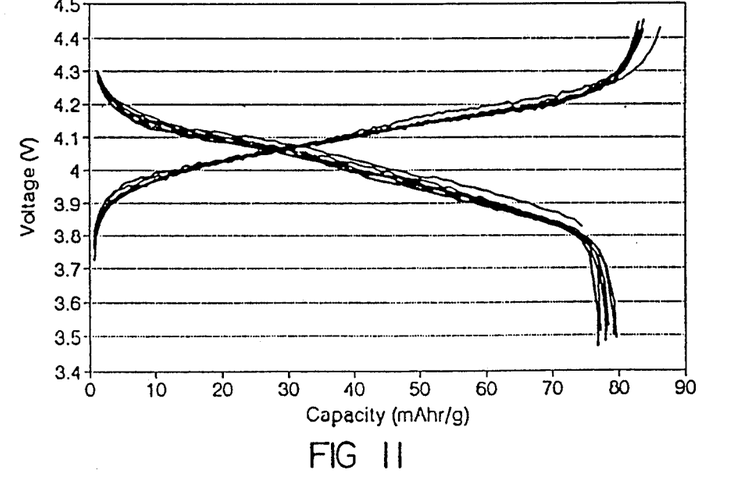

Example 7 was repeated, save that the mixture was fired at 450° C. for 48 hours, and then at 650° C. for a further 48 hours. The powder X-ray diffraction pattern of the product is given in FIG. 16(C). Charge and discharge profiles of a cell of the type given in Example 1 and incorporating the product material of this example as an electrode, for the first 10 cycles, is given in FIG. 11. The electrode capacity increases slightly with cycling as reflected by a plot of the electrode capacity v cycle number given in FIG. 14.

The stability of the capacities of cells incorporating the compound according to the invention as electrode, on cycling, is clearly demonstrated in FIGS. 6 to 11, 13 and 14.

Figure 17:
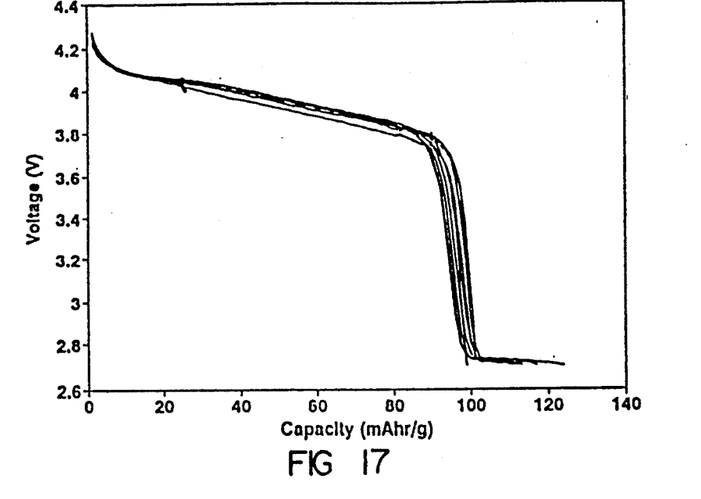
FIGS. 17 and 18 show, respectively, further comparative charge and discharge profiles of electrochemical cells having the compounds of Examples 2 and 3 respectively as electrodes.
Figure 18:
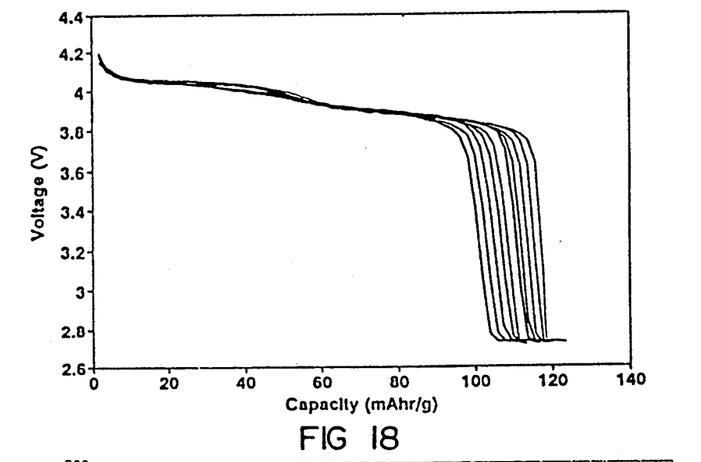

With reference to FIGS. 17 and 18, the cells of Examples 2 and 3 were cycled between 2,7 V and 4,5 V, to compare their stabilities when cycled onto the cell plateau at 2,7 V. The cell in accordance with the invention (FIG. 18) showed improved stability under these conditions, as compared to the control cell, which is attributed to the suppression of the Jahn-Teller effect in the electrode of the present invention. In other words, the cell in accordance with Example 2 shows capacity loss at approximately 2,7 V which is attributed to tetragonal distortion due to the Jahn Teller effect, which distortion is suppressed in the cell of Example 3.

EXAMPLE 9

Figure 19:
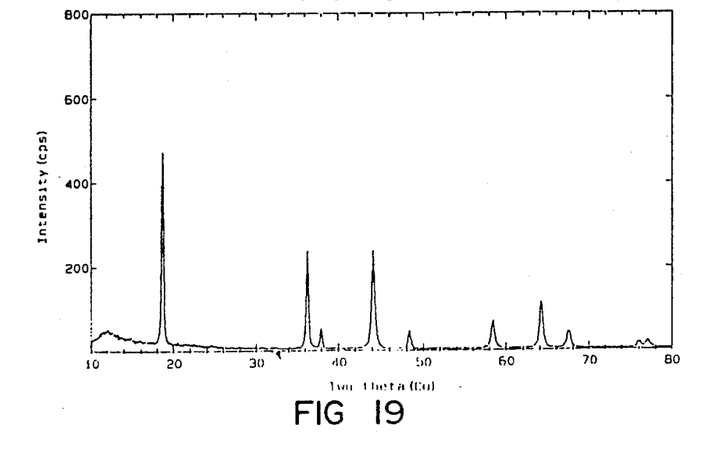
FIG. 19 shows an X-ray diffraction pattern of the spinel compound of Example 9.
Figure 20A:
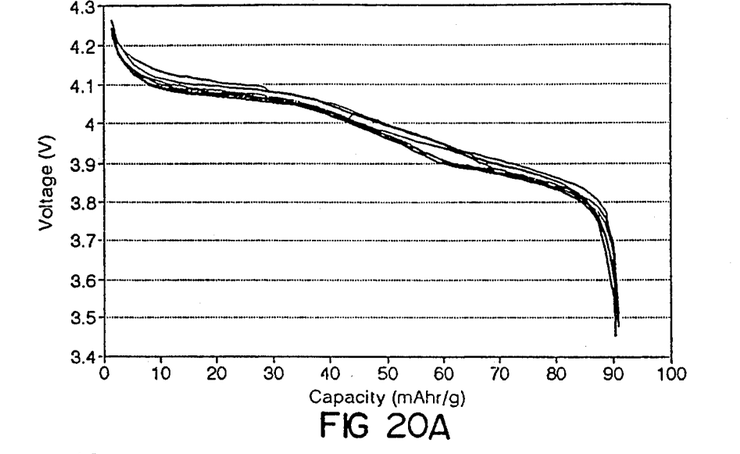
FIGS. 20A and 20B show, respectively, charge and discharge profiles of an electrochemical cell in accordance with the invention, having the compound of Example 9 as an electrode.
Figure 20B:
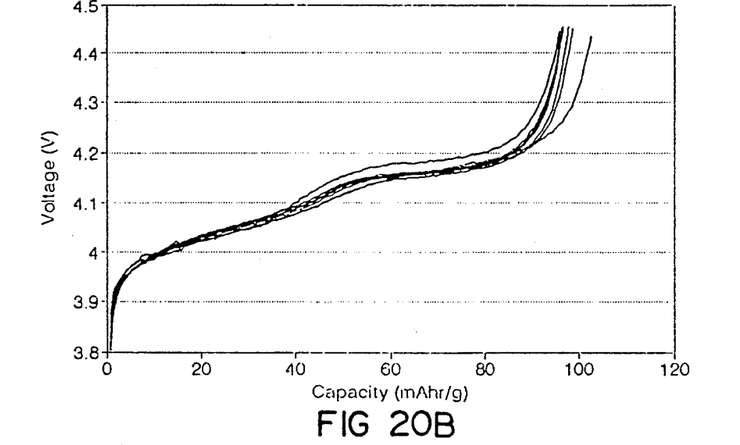
Figure 21:
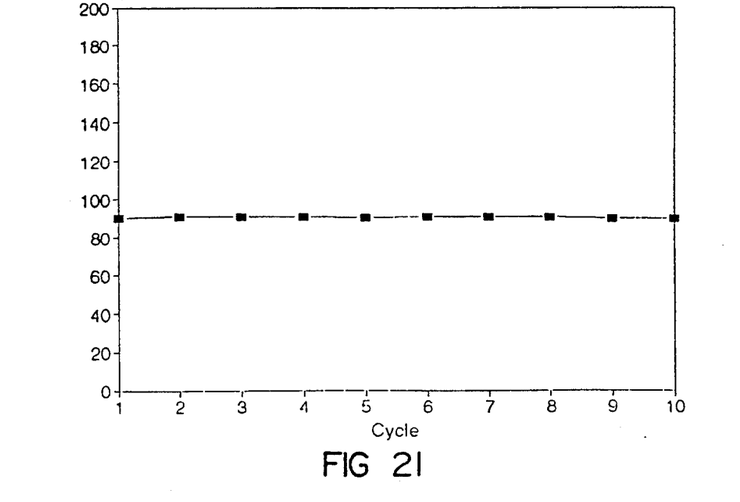
FIG. 21 shows a plot of electrode capacity vs cycle number for an electrochemical cell in accordance with the invention having the electrode of Example 9.

$Li_{1,1}Mn_{1,9}O_4$ was synthesized by reacting the stoichiometrically required amounts of lithium and manganese from $Li_2CO_3$ and $\gamma$-$MnO_2$ (chemically-prepared CMD) at 650° C. in air for 48 hours. The X-ray diffraction pattern of the spinel product or compound is shown in FIG. 19. The discharge and charge profiles of a cell of the type Li/1M $LiClO_4$ in propylene carbonate/$Li_{1,1}Mn_{1,9}O_4$ where the $Li_{1,1}Mn_{1,9}O_4$ is the product material of this example, for the first 10 cycles are shown in FIGS. 20A and 20B, respectively. The stability of the electrode as reflected by a plot of the electrode capacity v cycle number is given in FIG. 21. A rechargeable capacity of 90 mAh per gram of $Li_{1,1}Mn_{1,9}O_4$ was obtained from the electrode.

EXAMPLE 10

Figure 22:
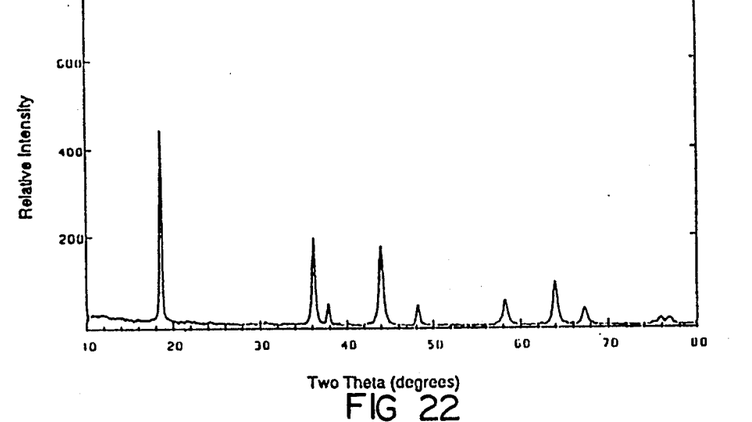
FIG. 22 shows the X-ray diffraction pattern of the spinel compound of Example 10.
Figure 23:
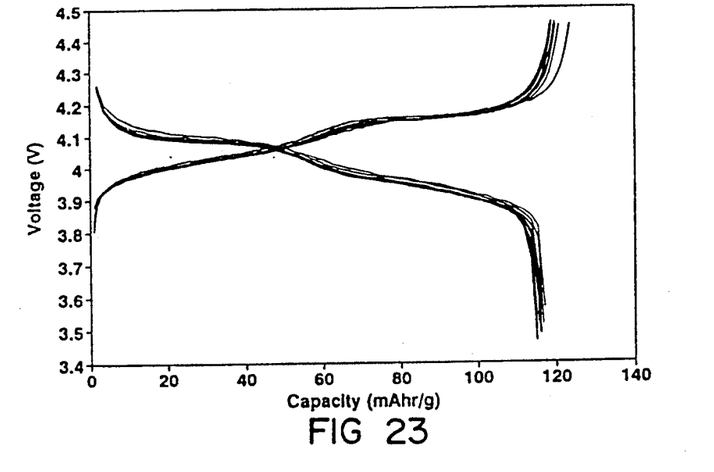
FIG. 23 shows charge and discharge profiles of an electrochemical cell in accordance with the invention, having the compound of Example 10 as an electrode.
Figure 24:
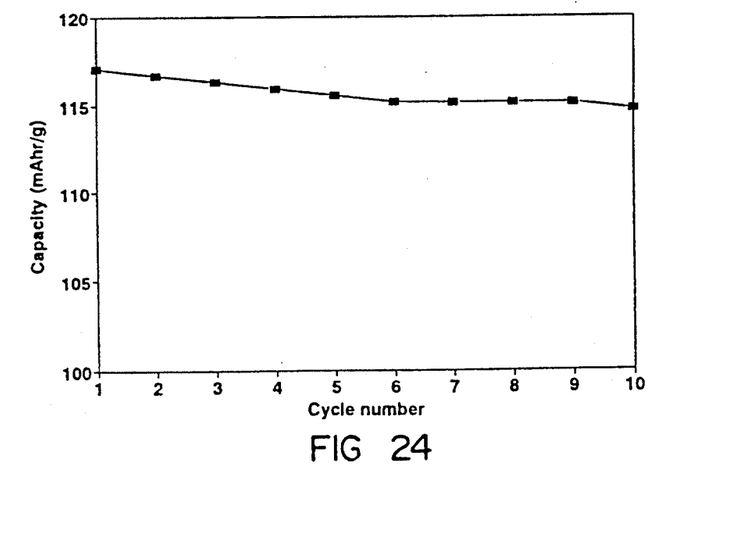
FIG. 24 shows a plot of electrode capacity vs cycle number for an electrochemical cell in accordance with the invention, having the electrode of Example 10.

An electrode of composition $LiMn_2O_{4+\delta}$ where $0 < \delta \leq 0.2$ was prepared by reaction of $\gamma$-$MnO_2$ (CMD) and $LiOH \cdot H_2O$ in a 2:1 molar ratio, initially at 450° C. for 48 hours, followed by reaction at 600° C. for 48 hours. The X-ray diffraction pattern of the product is shown in FIG. 22. The discharge and charge profiles of a Li/1M $LiClO_4$ in propylene carbonate/$LiMn_2O_{4+\delta}$ cell for the first 10 cycles are shown in FIG. 23. This cell showed a stable cycling capacity of approximately 115 mAh/g (FIG. 24).

The invention extends also to overdischarged cathodes formed from $Li_{1+x}Mn_{2-x}O_{4+\delta}$ electrodes (particularly to those in which the cubic symmetry of the precursor electrode is maintained) in addition to delithiated cathodes formed from the $Li_{1+x}Mn_{2-x}O_{4+\delta}$ electrodes, as hereinbefore described.

Figure 25:
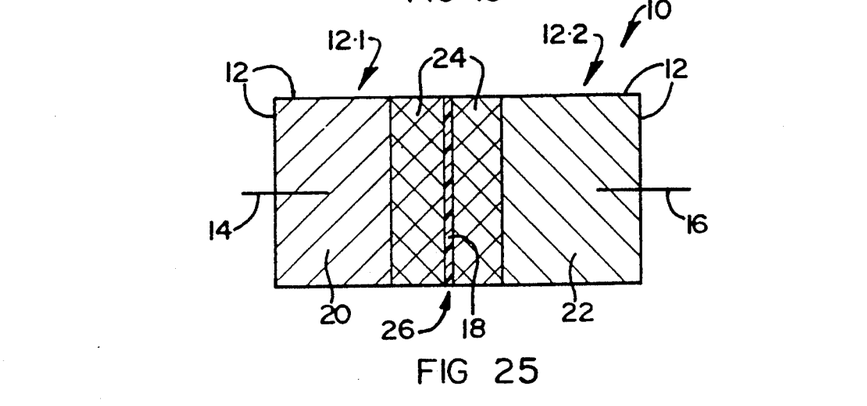
FIG. 25 shows a schematic cross-section of an electrochemical cell in accordance with the present invention.

In FIG. 25, a schematic sectional side elevation of a test cell in accordance with the present invention is generally designated by reference numeral 10. The cell comprises a housing 12 having an anode terminal 14, a cathode terminal 16 and a microporous polypropylene cell separator 18 dividing the housing into a cathode compartment and an anode compartment. An anode 20 is located in the anode compartment in contact with the terminal 14. The cell cathode is designated 22 and is located in the cathode compartment in contact with the cathode terminal 16; and comprises cathode material in particulate form but compressed to form a mass held together by a polytetrafluoroethylene (PTFE) binder and containing acetylene black in conventional proportions as current collector dispersed therein. The anode and cathode are coupled together by an electrolyte 24 comprising a 1 Molar solution of $LiClO_4$ dissolved in a solvent which is propylene carbonate.

The part 12.1 of the housing 12 which defines the anode compartment and contains the anode is electronically insulated at 26 from the part 12.2 of the housing which defines the cathode compartment and contains the cathode.

We claim:
1. An electrochemical cell which comprises
   a cell housing;
   a cathode located in the cell housing, the cathode comprising at least one electrochemically active compound of lithium, manganese and oxygen, having a spinel-type structure and having the general formula

$Li_1D_{x/b}Mn_{2-x}O_{4+\delta}$ where
   (i) x is a number such that $0 \leq x < 0,33$;
   (ii) $\delta$ is a number such that $0 \leq \delta < 0,5$, with the values of x and $\delta$ being such that the oxidation state N of the manganese cation is $3,5 < N < 4,0$;
   (iii) D is a mono- or multi-valent metal cation; and
   (iv) b is the oxidation state of D; and
   an electrolyte located in the cell housing,
with the cell housing, electrolyte and cathode arranged to permit a charging potential to be applied to the cell to cause lithium from the cathode to form, in the cell housing, at least part of the anode, while the electrolyte couples the cathode electrochemically to the anode, and insulates it electronically therefrom.

2. An electrochemical cell according to claim 1 wherein, in respect of the compound, D is Li so that b is 1, with formula (1) then being $Li_{1+x}Mn_{2-x}O_{4+\delta}$.

3. An electrochemical cell according to claim 1 wherein, in respect of the compound, D is Mg so that b is 2, with formula (1) then being $Li_1Mg_{x/2}{}^{2+}Mn_{2-x}O_{4+\delta}$.

4. An electrochemical cell according to claim 1 wherein, in respect of the compound, D is Co so that b is 3, with formula (1) then being $Li_1Co_{x/3}{}^{3+}Mn_{2-x}O_{4+\delta}$.

5. An electrochemical cell according to claim 1 wherein, in respect of the compound, $0 \leq x < 0,2$ and $0 \leq \delta < 0,2$ so that $3,5 < N < 3,78$.

6. An electrochemical cell according to claim 5 wherein, in respect of the compound, $0 \leq x \leq 0,1$ and $0 \leq \delta \leq 0,1$ so that $3,5 < N \leq 3,74$.

7. An electrochemical cell according to claim 6 wherein, in respect of the compound, $\delta = 0$ and $0 < x \leq 0,1$ so that $3,5 < N \leq 3,63$.

8. An electrochemical cell according to claim 7 wherein, in respect of the compound, $0 < x \leq 0,05$ so that $3,5 < N \leq 3,56$.

9. An electrochemical cell according to claim 1, wherein the cell housing initially contains, as at least part of the anode, electrochemically active lithium, the anode being electrochemically connected to an anode terminal, and the active lithium being selected from the group comprising lithium metal, a lithium/aluminium alloy, a lithium/silicon alloy, a lithium/carbon compound and mixtures thereof.

10. An electrochemical cell according to claim 1, wherein there is initially no electrochemically active lithium in the housing and which forms part of the anode.

11. An electrochemical cell according to claim 1, wherein the electrolyte comprises a lithium salt selected from the group comprising $LiClO_4$, $LiAsF_6$, $LiBF_4$ and mixtures thereof, dissolved in an organic solvent selected from the group comprising propylene carbonate, ethylene carbonate, dimethoxy ethane, dimethyl carbonate and mixtures thereof, with the anode being separated from the cathode by a microporous separator of electronically insulating material which is permeable by and impregnated by the electrolyte.

12. A method of making an electrochemical cell, which method comprises
loading, into a cell housing, an electrolyte and a cathode comprising at least one electrochemically active compound of lithium, manganese and oxygen, the compound having a spinel-type structure and having the general formula $$Li_1D_{x/b}Mn_{2-x}O_{4+\delta}$$

where
(i) x is a number such that $0 \leq x < 0,33$;
(ii) $\delta$ is a number such that $0 \leq \delta < 0,5$, with the values of x and $\delta$ being such that the oxidation state N of the manganese cation is $3,5 < N < 4,0$;
(iii) D is a mono- or multi-valent metal cation; and
(iv) b is the oxidation state of D; and
arranging the electrolyte and cathode in the housing to permit a charging potential to be applied to the cell to cause lithium from the cathode to form, in the cell housing, at least part of an anode, while the electrolyte couples the cathode electrochemically to the anode, and insulating it electrochemically therefrom.

13. A method according to claim 12, which includes the step of producing the cathode compound by reacting a lithium containing component selected from lithium salts, lithium oxides, lithium hydroxides and mixtures thereof, and that decomposes when heated in air, with a manganese containing component selected from manganese salts, manganese oxides, manganese hydroxides, lithium manganese oxides and mixtures thereof, and that also decomposes when heated in air, at a reaction temperature of 300°-750° C. for a period of 2-96 hours, to provide the compound of formula (1).

14. A electrochemical cell, whenever made by a method as claimed in claim 12.

* * * * *

UNITED STATES PATENT AND TRADEMARK OFFICE
CERTIFICATE OF CORRECTION

PATENT NO.    :   5,316,877

DATED         :   May 31, 1994

INVENTOR(S)   :   Michael M. Thackeray; Rosalind J. Gummow

It is certified that error appears in the above-identified patent and that said Letters Patent is hereby corrected as shown below:

column 3, line 5, replace the formula printed in the patent with the following:

$$\text{--LiOH} + 2\text{MnO}_2 \xrightarrow{0,05O_2} \text{LiMn}_2\text{O}_{4,1} + \text{OH}^-\text{--}$$

Signed and Sealed this

Thirteenth Day of September, 1994

Attest:

BRUCE LEHMAN

*Attesting Officer*        *Commissioner of Patents and Trademarks*